US011470222B2

(12) United States Patent
Umeda (10) Patent No.: US 11,470,222 B2
(45) Date of Patent: Oct. 11, 2022

(54) COMMUNICATION APPARATUS AND CONTROL METHOD FOR COMMUNICATION APPARATUS

(71) Applicant: CANON KABUSHIKI KAISHA, Tokyo (JP)

(72) Inventor: Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/063,525

(22) Filed: Oct. 5, 2020

(65) Prior Publication Data

US 2021/0021734 A1 Jan. 21, 2021

Related U.S. Application Data

(63) Continuation of application No. 15/362,574, filed on Nov. 28, 2016.

(30) Foreign Application Priority Data

Dec. 4, 2015 (JP) .................................. 2015-237983

(51) Int. Cl.
  *H04N 1/44* (2006.01)
  *H04N 1/32* (2006.01)
  *H04N 1/327* (2006.01)

(52) U.S. Cl.
  CPC ....... *H04N 1/4433* (2013.01); *H04N 1/32117* (2013.01); *H04N 1/32776* (2013.01); *H04N 2201/006* (2013.01); *H04N 2201/0094* (2013.01); *H04N 2201/3205* (2013.01)

(58) Field of Classification Search
  None
  See application file for complete search history.

(56) References Cited

U.S. PATENT DOCUMENTS

| 9,826,156 B1* | 11/2017 | Liu | H04N 5/2258 |
| 2015/0378296 A1* | 12/2015 | Kim | H04N 1/4433 399/80 |
| 2017/0142767 A1* | 5/2017 | Furubayashi | H04W 76/14 |
| 2018/0015755 A1* | 1/2018 | Yamada | G06F 3/1236 |

\* cited by examiner

*Primary Examiner* — Fan Zhang
(74) *Attorney, Agent, or Firm* — Canon U.S.A., Inc. IP Division (57) ABSTRACT

A communication apparatus includes a reception unit that receives a Bluetooth® beacon signal transmitted from a printing apparatus, an identification unit that identifies a reception field intensity of the beacon signal, a display unit that displays a reception screen for receiving a transmission instruction in a case where the identified reception field intensity is less than a first threshold and greater than or equal to a second threshold that is smaller than the first threshold, and a transmission unit that transmits, to the printing apparatus, an authentication request enabling a user to log into the printing apparatus in response to receipt of the transmission instruction.

14 Claims, 11 Drawing Sheets

COMMUNICATION APPARATUS AND CONTROL METHOD FOR COMMUNICATION APPARATUS

CROSS REFERENCE TO RELATED APPLICATIONS

This application is a continuation of U.S. patent application Ser. No. 15/362,574, which was filed on Nov. 28, 2016 and which claims priority to Japanese Patent Application No. 2015-237983, which was filed on Dec. 4, 2015, all of which are hereby incorporated by reference herein in their entirety.

BACKGROUND

Field

The present disclosure relates to a communication apparatus that transmits an authentication request, and a control method for the communication apparatus.

Description of the Related Art

Among conventional image forming apparatuses such as a printer and a multifunction peripheral, one type of image forming apparatus has a user authenticating function using a radio frequency identification (RFID) tag to manage permission/prohibition of use by a user. The image forming apparatus of this type includes a tag reader/writer for the RFID tag. When the RFID tag is near the image forming apparatus, the tag reader/writer reads out authentication data from the RFID tag, and the image forming apparatus authenticates the user based on the authentication data read out.

In recent years, mobile terminals, such as a smartphone and a tablet personal computer (PC), as well as image forming apparatuses have been installed with near field communication (NFC) that is a short-range wireless communication technology. A mobile terminal installed with NFC can read data from and write data to an RFID card or NFC card by using a reader/writer function of NFC. Therefore, a function equivalent to the user authentication using the RFID tag can be implemented between an image forming apparatus installed with NFC and the mobile terminal installed with NFC. The image forming apparatus includes a function equivalent to the RFID tag by utilizing a card emulation function of NFC, and therefore the mobile terminal writes authentication data to the image forming apparatus.

Japanese Patent Application Laid-Open No. 2015-50684 discusses a technique for performing user authentication based on ID data. According to the technique, when a mobile terminal installed with NFC comes near an image forming apparatus, the mobile terminal writes ID data to an NFC unit of the image forming apparatus, and the image forming apparatus performs user authentication based on the ID data.

In recent years, the number of mobile terminals supporting NFC has increased. However, not all mobile terminals support NFC. A user having a mobile terminal not supporting NFC cannot carry out login using NFC with the mobile terminal. Such a user has to have a dedicated card, besides the mobile terminal, and carry out login using the dedicated card, which is inconvenient.

SUMMARY

According to aspects of the embodiments, a communication apparatus includes a reception unit configured to receive a Bluetooth® beacon signal transmitted from a printing apparatus, an identification unit configured to identify a reception field intensity of the beacon signal, a display unit configured to display a reception screen for receiving a transmission instruction in a case where the identified reception field intensity is less than a first threshold and greater than or equal to a second threshold that is smaller than the first threshold, and a transmission unit configured to transmit, to the printing apparatus, an authentication request, enabling a user to log into the printing apparatus in response to receipt of the transmission instruction, wherein, in a case where the identified reception field intensity is greater than or equal to the first threshold, the transmission unit automatically transmits the authentication request to the printing apparatus without receiving the transmission instruction.

Further features will become apparent from the following description of exemplary embodiments with reference to the attached drawings.

DESCRIPTION OF THE EMBODIMENTS

Exemplary embodiments will be described below with reference to the drawings.

Figure 1:
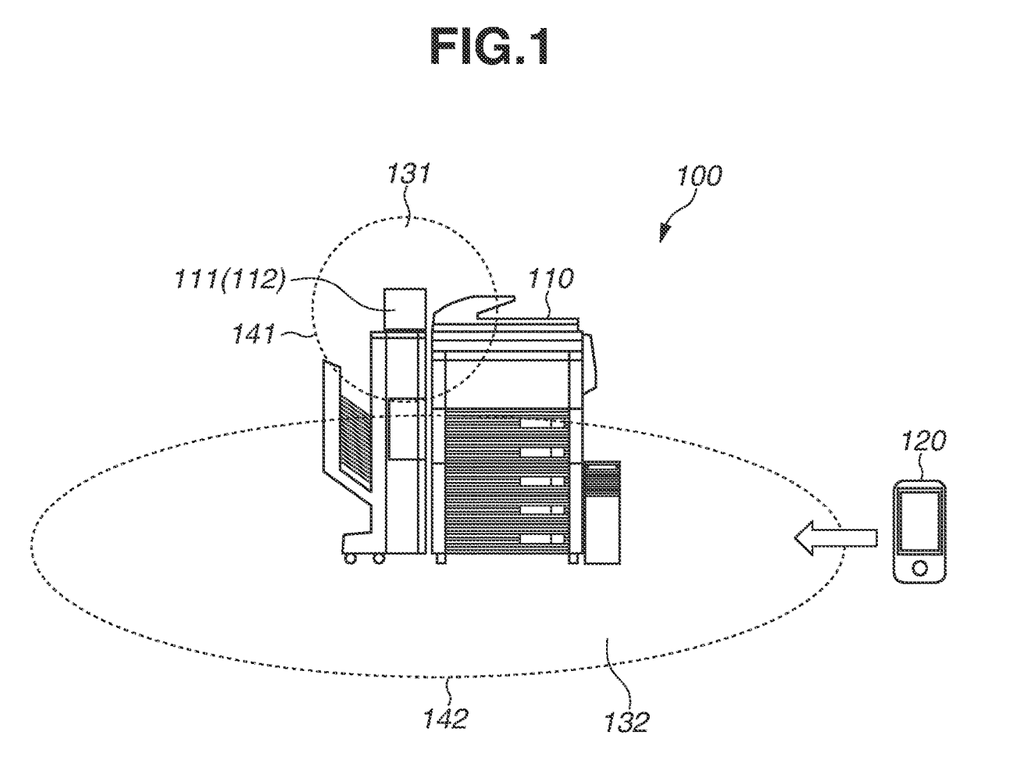
FIG. 1 is a diagram illustrating an image forming system.

FIG. 1 is a diagram illustrating an image forming system 100 according to a first exemplary embodiment. The image forming system 100 includes an image forming apparatus 110 and a mobile terminal 120. The mobile terminal 120 is an example of a wireless communication apparatus. The image forming apparatus 110 is an example of an apparatus external to the mobile terminal 120. The image forming apparatus 110 and the mobile terminal 120 each have a Bluetooth® function, and perform wireless communication based on Bluetooth®. The image forming apparatus 110 includes a device port 111. The device port 111 includes a Bluetooth® interface unit 112 built therein. The Bluetooth® interface unit 112 sends a beacon signal to an external apparatus (a wireless communication apparatus) having a Bluetooth® function, and communicates with the external apparatus for information about user authentication. Here, the beacon signal is an electric wave for notifying the presence of the sender of the beacon signal to the external apparatus including the Bluetooth® function at a short distance.

The mobile terminal 120, by receiving the beacon signal, recognizes that the image forming apparatus 110 is nearby. The mobile terminal 120, according to the present exemplary embodiment, controls login processing for logging in to the image forming apparatus 110 based on an inter-apparatus distance between the mobile terminal 120 and the image forming apparatus 110. The beacon signal received by the mobile terminal 120 has a reception intensity that depends on the inter-apparatus distance between the mobile terminal 120 and the image forming apparatus 110. More specifically, the beacon signal has a field intensity that becomes smaller as the inter-apparatus distance becomes greater. Therefore, in the present exemplary embodiment, the mobile terminal 120 controls the login processing for logging in to the image forming apparatus 110 according to the field intensity in order to control the login processing according to the inter-apparatus distance.

A first area 131 and a second area 132 illustrated in FIG. 1 are determined according to the reception intensity of the image forming apparatus 110. In the login processing, the mobile terminal 120 confirms which one of the first area 131, the second area 132, or an area outside the second area 132 the mobile terminal 120 belongs to. The mobile terminal 120 then performs processing, i.e., processing according to the login processing, corresponding to the area to which the mobile terminal 120 belongs. The first area 131 is inside a first boundary line 141. The second area 132 is outside the first boundary line 141 and inside a second boundary line 142. The first boundary line 141 and the second boundary line 142 each correspond to a position where the field intensity of the beacon signal takes a predetermined value. The first area 131, the second area 132, the first boundary line 141, and the second boundary line 142 will be described below.

Figure 2A:
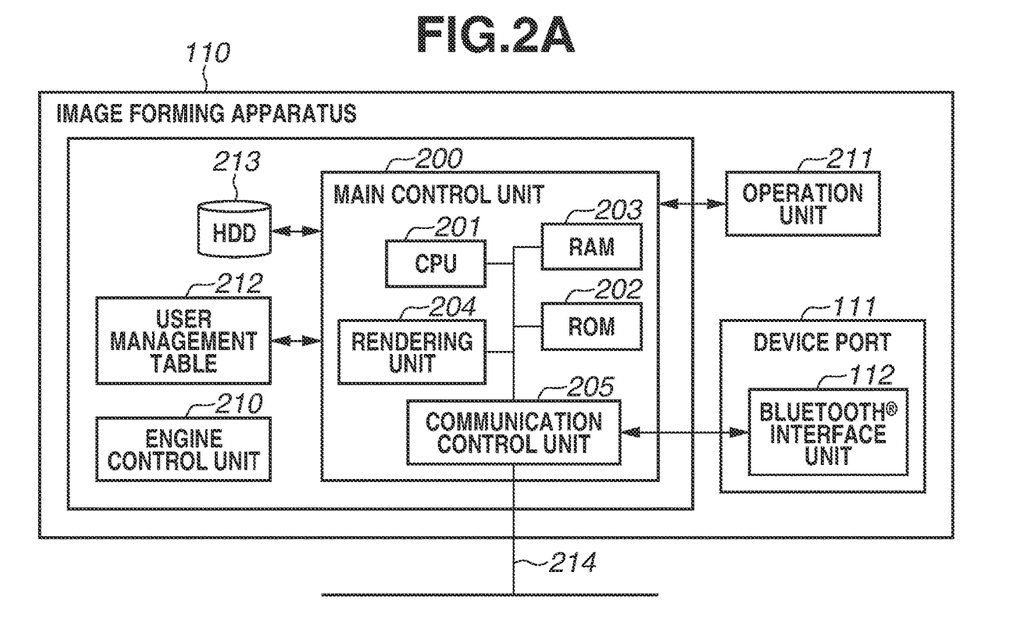
FIGS. 2A and 2B are a block diagram illustrating a hardware configuration of an image forming apparatus and a block diagram illustrating a hardware configuration of a mobile terminal, respectively.

FIG. 2A is a block diagram illustrating a hardware configuration of the image forming apparatus 110. The image forming apparatus 110 includes a main control unit 200, an engine control unit 210, an operation unit 211, a user management table 212, and a hard disk drive (HDD) 213, in addition to the device port 111 with the Bluetooth® interface unit 112 built therein. The main control unit 200 controls main functions of the image forming apparatus 110, such as communication, data input, and rendering. The engine control unit 210 controls execution of printing. The operation unit 211 includes a display unit, such as a liquid crystal display (LCD), and an input unit, such as hardware keys and/or a touch panel.

The main control unit 200 includes a central processing unit (CPU) 201, a read only memory (ROM) 202, a random access memory (RAM) 203, a rendering unit 204, and a communication control unit 205. The CPU 201 controls the entire image forming apparatus 110. The ROM 202 stores various control programs to be processed by the CPU 201. The RAM 203 is a readable/writable memory that enables the CPU 201 to execute a program therein. The CPU 201 loads a program from the ROM 202 into the RAM 203, and executes the program. Functions and processing of the image forming apparatus 110 as described below are implemented by the CPU 201 reading a program stored in the ROM 202 or the HDD 213, and executing the program.

The rendering unit 204 generates print data and outputs the generated print data to the engine control unit 210. The communication control unit 205 transmits/receives information to/from an external device via a network. The communication control unit 205 controls the Bluetooth® interface unit 112, and transmits/receives information to/from an external apparatus including a Bluetooth® function. The user management table 212 stores and manages user information. The user management table 212 manages, for example, information such as an IP address of a user's mobile terminal, a login name, and a password. The HDD 213 is a large-capacity storage unit and stores large amounts of print data and scan data. The communication control unit 205 is connected to a network 214 that enables communication between the image forming apparatus 110 and an external apparatus. When a user holds a mobile terminal or card over the device port 111, or places the mobile terminal or card on the device port 111, the device port 111 and the mobile terminal or card (RFID) are assumed to be in contact with each other. The device port 111 reads out authentication information from the mobile terminal or card, and then performs user authentication based on the authentication information.

Figure 2B:
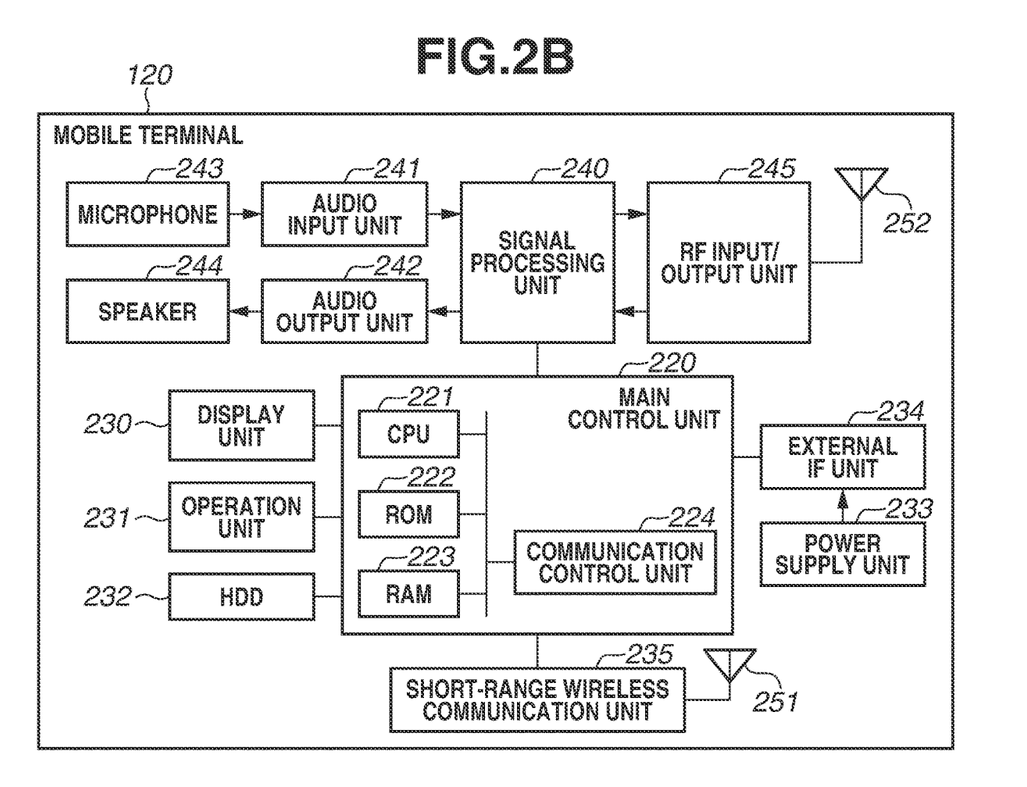

FIG. 2B is a block diagram illustrating a hardware configuration of the mobile terminal 120. The mobile terminal 120 includes a main control unit 220, a display unit 230, an operation unit 231, a HDD 232, a power supply unit 233, and a short-range wireless communication unit 235. The mobile terminal 120 also includes a signal processing unit 240, an audio input unit 241, an audio output unit 242, a microphone 243, a speaker 244, a RF input/output unit 245, and antennas 251 and 252.

The main control unit 220 is a main part for implementing functions of the mobile terminal 120. The main control unit 220 includes a CPU 221, a ROM 222, a RAM 223, and a communication control unit 224. The communication control unit 224 exchanges commands and data with the short-range wireless communication unit 235. The CPU 221, the ROM 222, and the RAM 223 are similar to the CPU 201, the ROM 202, and the RAM 203 illustrated in FIG. 2A, respectively. Functions and processing of the mobile terminal 120 described below are implemented by the CPU 221 reading out a program stored in the ROM 222 or the HDD 232, and executing the program.

The display unit 230, the operation unit 231, the HDD 232, an external IF unit 234, the short-range wireless communication unit 235, and the signal processing unit 240 are connected to the main control unit 220. The display unit 230 performs display output of information to the user, and includes an LCD driver and an LCD display device. The operation unit 231 is a user interface used by the user to input information into the mobile terminal 120. The display unit 230 includes a touch sensor. The user can input an instruction by touching the display unit 230. The HDD 232 is a large-capacity storage unit and stores various kinds of information. The power supply unit 233 supplies power necessary for each element of the mobile terminal 120 from a battery power source via the external IF unit 234.

The microphone 243 and the speaker 244 are connected to the audio input unit 241 and the audio output unit 242, respectively. The audio input unit 241 converts an analog voice signal input from the microphone 243 into a digital voice signal. The audio output unit 242 causes the speaker 244 to output the digital voice signal as sound by controlling the speaker 244. The signal processing unit 240 is connected to the audio input unit 241, the audio output unit 242, and the RF input/output unit 245. The antenna 252 is connected to the RF input/output unit 245. The signal processing unit 240 performs processing such as encoding/decoding of digital voice signals. The RF input/output unit 245 performs high frequency transmission and reception.

The short-range wireless communication unit 235 is connected to the communication control unit 224 of the main control unit 220, and exchanges data with an external apparatus via the antenna 251, i.e., communication processing. The communication control unit 224 controls a communication function in Bluetooth® communication that is the short-range wireless communication by exchanging commands. The communication control unit 224 also detects the field intensity of the beacon signal received from the antenna 251, i.e., field intensity detection processing.

The field intensity of the beacon signal received by the mobile terminal 120 will be described with reference to FIG. 1 and FIGS. 3A and 3B. It is known that the beacon signal attenuates and the field intensity thus becomes weak as the distance from a source device of the beacon signal increases. In general, a relationship between a field intensity and a distance from a transmission source is represented by the following expression (1).

$$RSSI(r) = A - 10 \times B \times \log 10(r) \quad (1)$$

Here, RSSI(r) represents the field intensity in a distance r from the transmission source i.e., received signal strength indication, and hereinafter abbreviated as RSSI. In the expression (1), A is RSSI measured at a distance of approximately 1 meter from the transmission source, and B is a constant that represents the degree of attenuation of an electric wave and is theoretically "2". According to the expression (1), the distance between the image forming apparatus 110 and the mobile terminal 120 can be estimated based on the field intensity of the received beacon signal.

Figure 3A:
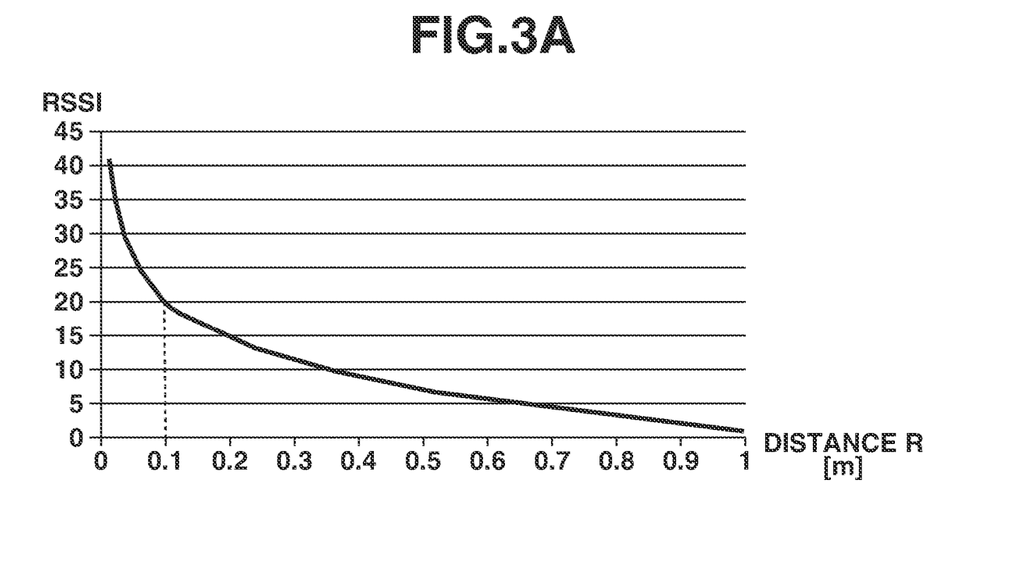
FIGS. 3A and 3B are graphs each representing a relationship between distance and field intensity.
Figure 3B:
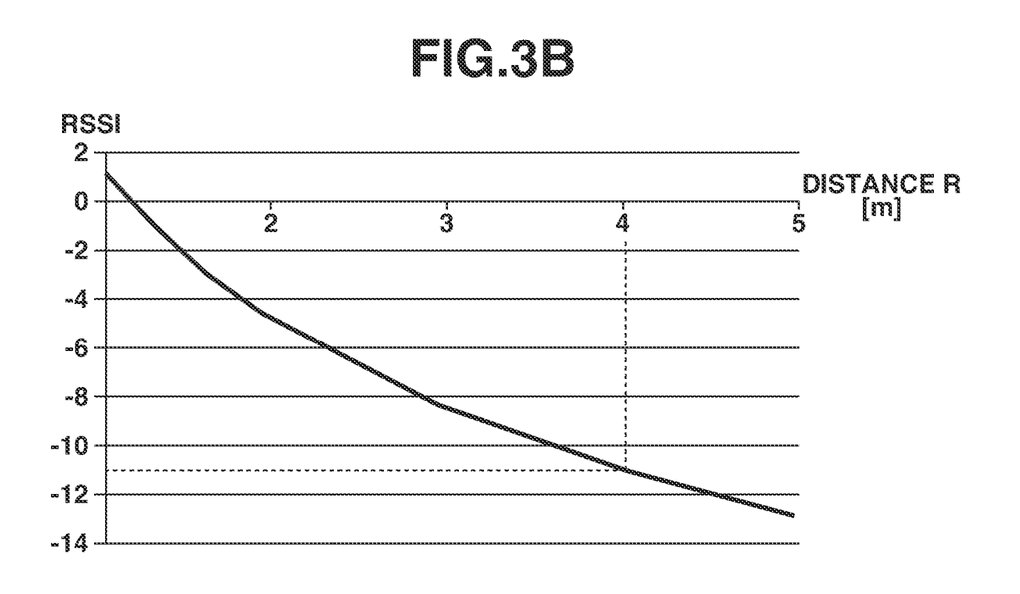

FIG. 3A is a graph representing a relationship between a distance R and the expression (1) of RSSI when the distance is less than or equal to 1 meter. FIG. 3B is a graph representing a relationship between the distance R and the expression (1) of RSSI when the distance is between 1 m and 5 m. In the graph in each of FIGS. 3A and 3B, the value of A, i.e., the value of RSSI measured at a distance of about 1 meter, is assumed to be 1. In the graphs in FIGS. 3A and 3B, a vertical axis indicates the value of RSSI and a horizontal axis indicates the distance from the beacon-signal transmission source.

A storage unit, such as the HDD 232 of the mobile terminal 120 according to the present exemplary embodiment, stores beforehand a first threshold and a second threshold of the field intensity. The mobile terminal 120 uses the first threshold and the second threshold in the login processing, which is described below, for logging in to the image forming apparatus 110. In the present exemplary embodiment, RSSI=20 and RSSI=-11 are assumed to be set as the first threshold and the second threshold, respectively. As indicated by the graph of FIG. 3A, RSSI=20 corresponds to the distance R=0.1 according to the expression (1). The first boundary line 141 illustrated in FIG. 1 is assumed to correspond to RSSI=20. As indicated by the graph of FIG. 3B, RSSI=-11 corresponds to the distance R=4 m according to the expression (1). The second boundary line 142 illustrated in FIG. 1 is assumed to correspond to RSSI=-11.

The first threshold and the second threshold can be registered in the storage unit according to input from a designer or the like. The designer or the like can define a first area and a second area according to the distance from the image forming apparatus 110, and determine the first threshold and the second threshold based on these areas. The first area is assumed to be an area in which the distance from the image forming apparatus 110 is less than a first threshold. In addition, the second area is assumed to be an area in which the distance from the image forming apparatus 110 is greater than or equal to the first threshold and less than a second threshold. The second threshold is a value greater than the first threshold in this case. According to the first area and the second area defined by the distance, the designer or the like can determine the first threshold and the second threshold of the field intensity by using the relationship represented by the expression (1).

In another example, the mobile terminal 120 can perform conversion from the first area and the second area to the first threshold and the second threshold. In this case, the designer or the like inputs a distance from the image forming apparatus 110 to an external boundary line of each of the first area and the second area into the mobile terminal 120. The CPU 221 of the mobile terminal 120 can calculate the first threshold and the second threshold of the field intensity from the respective distances according to the expression (1), and then register these thresholds in the storage unit.

The relationship between the reception intensity and the distance can also change based on the environmental conditions, such as temperature and humidity, and the state of the mobile terminal 120, e.g., whether the mobile terminal 120 is horizontal or vertical to the ground. It view of these variables, it is difficult to determine the correct distance from the expression (1) and the field intensity. As such, it is preferable to use the relationship represented by the expression (1) for estimation purposes.

As an example, assume that a user with the mobile terminal 120 approaches the image forming apparatus 110, as illustrated in FIG. 1. In this case, the mobile terminal 120 first enters the second area 132. Next, when the user brings the mobile terminal 120 close to the device port 111, the mobile terminal 120 passes the first boundary line 141 and then enters the first area 131. In response to such a movement of the user, the field intensity of the beacon signal received by the mobile terminal 120 changes.

Figure 4:
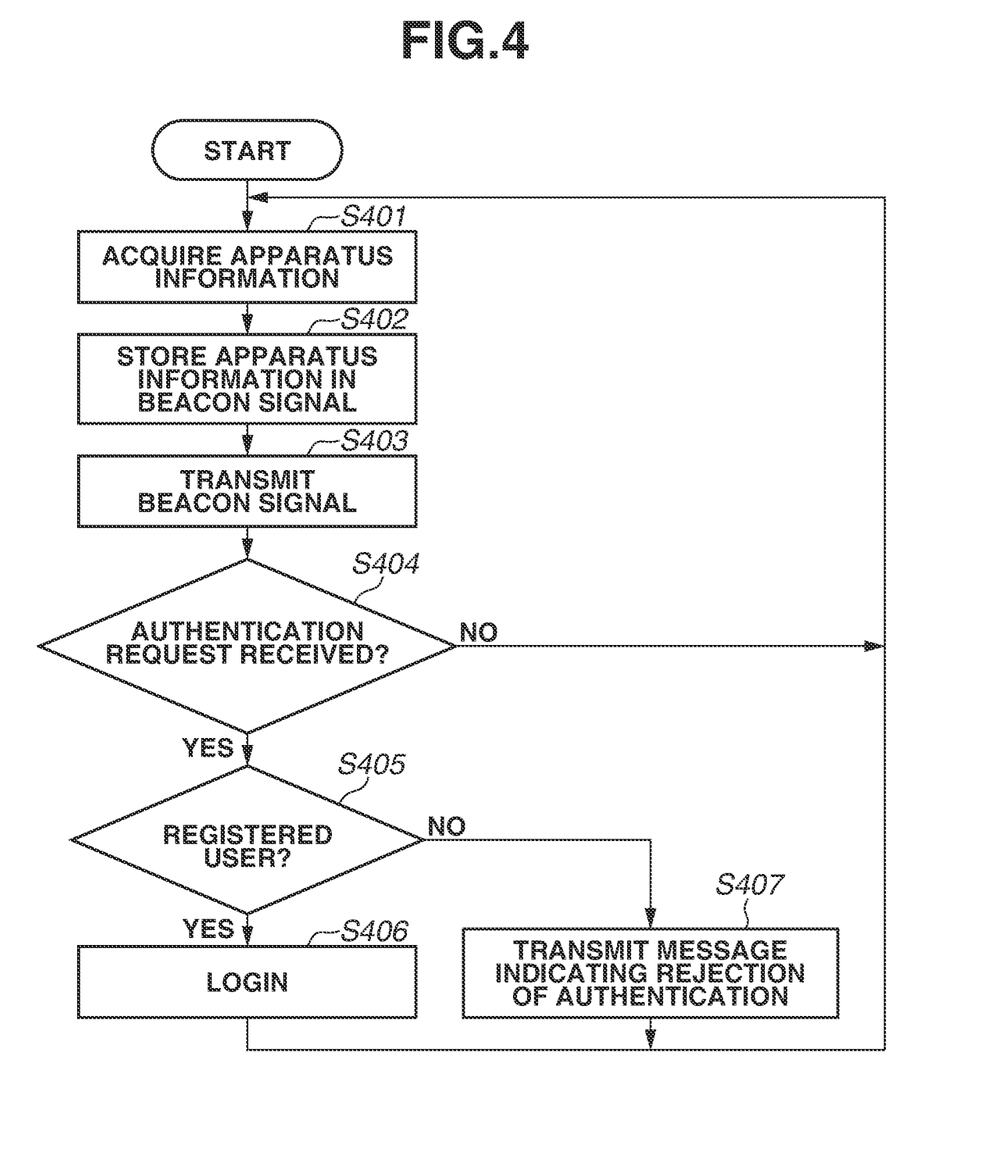
FIG. 4 is a flowchart illustrating login processing performed by the image forming apparatus.

FIG. 4 is a flowchart illustrating login processing performed by the image forming apparatus 110. In step S401, the CPU 201 of the image forming apparatus 110 acquires apparatus information about itself. In the present exemplary embodiment, the apparatus information is assumed to be an apparatus ID for identifying itself, i.e., identification information. The HDD 213 or another memory (not illustrated) is assumed to store the apparatus information. The apparatus information is, for example, an IP address or a name on a network of the image forming apparatus 110. Next, in step S402, the CPU 201 performs control for storing the apparatus information in a packet, and sending the packet to the Bluetooth® interface unit 112 via the communication control unit 205 for a purpose of transmitting the packet together with a beacon signal by the short distance communication. The Bluetooth® interface unit 112 stores the apparatus information sent from the CPU 201 in the beacon signal. Next, in step S403, the CPU 201 performs control for transmitting the beacon signal including the apparatus information.

Next, in step S404, the CPU 201 determines whether an authentication request is received from the external apparatus, i.e., the mobile terminal 120, via the network 214. When the CPU 201 determines that the authentication request is received (YES in step S404), the CPU 201 causes the processing to proceed to step S405. When the CPU 201 determines that the authentication request is not received (NO in step S404), the CPU 201 causes the processing to proceed to step S401. In other words, in this case, the CPU 201 prepares again for transmission of the beacon signal. The CPU 201 periodically transmits the beacon signal by repeating the processing from step S401 to step S403 until receipt of the authentication request. The authentication request to be received by the CPU 201 in step S404 is an authentication request to be transmitted by the mobile terminal 120 in a process in step S507 or S511, as described below with reference to FIG. 5.

Next, in step S405, the CPU 201 acquires an IP address of the external apparatus, i.e., the mobile terminal 120 that issued the authentication request from the received authentication request. The CPU 201 then confirms whether the acquired IP is an address of a registered user by referring to the user management table 212. When the CPU 201 confirms that the acquired IP address is an address of a registered user (YES in step S405), the CPU 201 causes the processing to proceed to step S406. When the CPU 201 confirms that the acquired IP address is not an address of a registered user (NO in step S405), the CPU 201 causes the processing to proceed to step S407. In step S406, the CPU 201 performs a login process. The processing then proceeds to step S401, i.e., the CPU 201 prepares again for transmission of the beacon signal. In step S407, the CPU 201 transmits a message indicating rejection of the authentication to the external apparatus, i.e., the mobile terminal 120, that is the transmission source of the authentication request. The processing then proceeds to step S401, i.e., the CPU 201 prepares again for transmission of the beacon signal.

Figure 5:
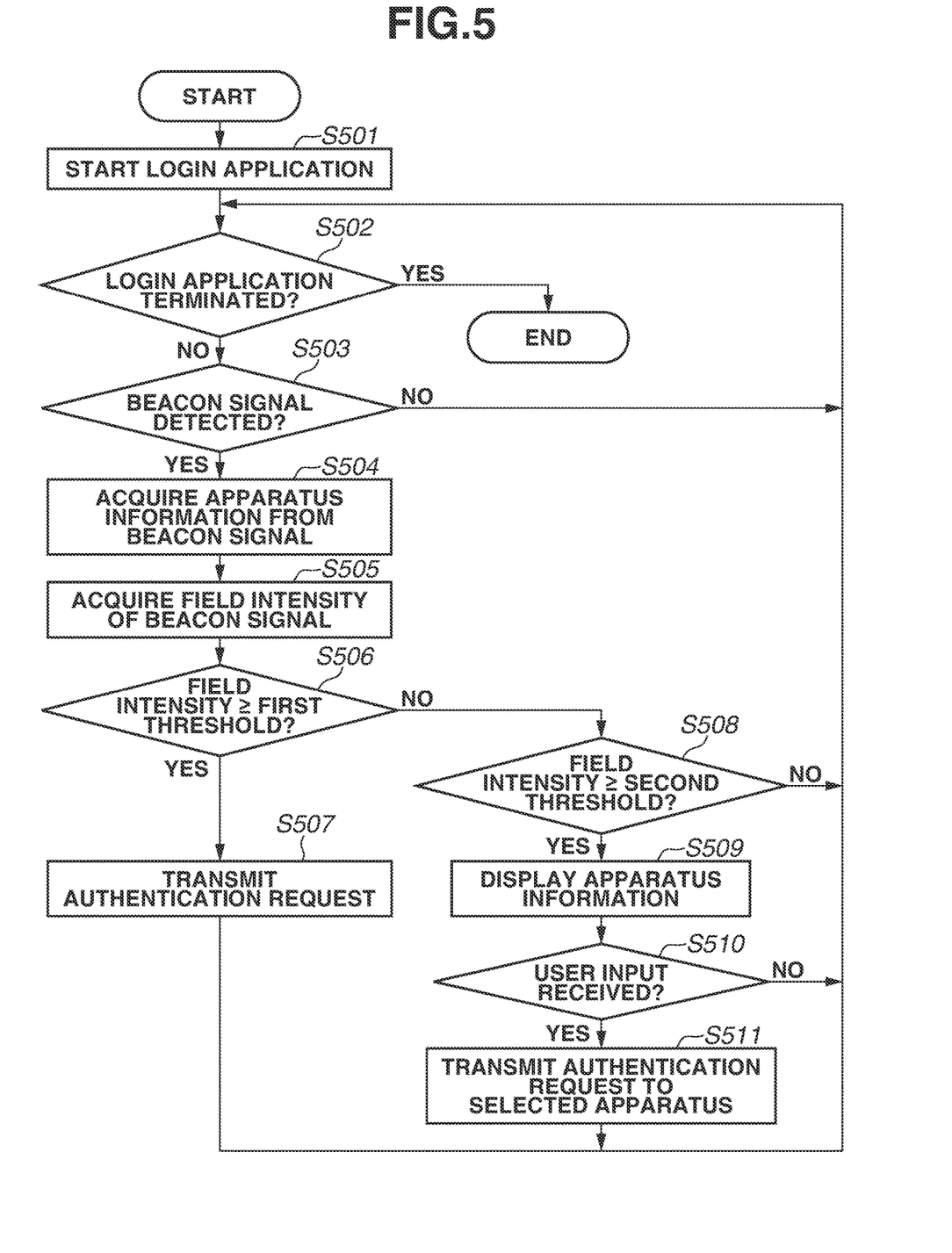
FIG. 5 is a flowchart illustrating login processing performed by the mobile terminal.

FIG. 5 is a flowchart illustrating the login processing that is information processing performed by the mobile terminal 120. In step S501, the CPU 221 of the mobile terminal 120 starts a login application. In the present exemplary embodiment, the CPU 221 is assumed to start an application in response to operation performed on the operation unit 231 by the user. In another example, the CPU 221 can automatically start an application when the mobile terminal 120 is turned on.

Next, in step S502, the CPU 221 confirms whether the login application started in step S501 is terminated. When the CPU 221 confirms that the login application is terminated (YES in step S502), the CPU 221 ends the login processing. When the CPU 221 confirms that the login application is not terminated (NO in step S502), the CPU 221 causes the processing to proceed to step S503. In the present exemplary embodiment, the CPU 221 is assumed to terminate an application in response to operation performed on the operation unit 231 by the user. In another example, the CPU 221 can terminate an application when the mobile terminal 120 is turned off.

In step S503, the CPU 221 confirms whether a beacon signal is detected by the antenna 251. The beacon signal to be detected in step S503 corresponds to the beacon signal transmitted in the beacon transmission processing (in step S403) performed by the image forming apparatus 110 described with reference to FIG. 4. When the CPU 221 confirms that the beacon signal is detected (YES in step S503), the CPU 221 causes the processing to proceed to step S504. When the CPU 221 confirms that the beacon signal is not detected (NO in step S503), the CPU 221 causes the processing to proceed to step S502. In step S504, the CPU 221 acquires apparatus information of an external apparatus, i.e., the image forming apparatus 110 that transmitted the beacon signal from the beacon signal. Next, in step S505, the CPU 221 acquires the field intensity of the beacon signal from the communication control unit 224.

Next, in step S506, the CPU 221 compares the field intensity acquired in step S505 with the first threshold set beforehand. In other words, the CPU 221 confirms whether the mobile terminal 120 belongs to the first area 131 illustrated in FIG. 1. When the field intensity is less than the first threshold (NO in step S506), the CPU 221 causes the processing to proceed to step S508.

When the field intensity is greater than or equal to the first threshold (YES in step S506), i.e. when the mobile terminal 120 belongs to the first area 131, the CPU 221 causes the processing to proceed to step S507. This can result in, when the image forming apparatus 110 and the mobile terminal 120 are in a short range, the user of the mobile terminal 120 to intentionally bring the mobile terminal 120 closer to log into the image forming apparatus 110. Thus, in this case, in step S507, the CPU 221 transmits the authentication request to the image forming apparatus 110. In other words, in this case, the CPU 221 automatically transmits the authentication request without checking with the user whether to transmit the authentication request. After the CPU 221 transmits the authentication request, the CPU 221 causes the processing to proceed to step S502.

In step S508, the CPU 221 compares the field intensity with the second threshold set beforehand. In other words, the CPU 221 confirms whether the mobile terminal 120 belongs to the second area 132 illustrated in FIG. 1. When the field intensity is less than the second threshold (NO in step S508), the CPU 221 causes the processing to proceed to step S502. When the field intensity is greater than or equal to the second threshold (YES in step S508), the CPU 221 causes the processing to proceed to step S509.

Figure 6A:
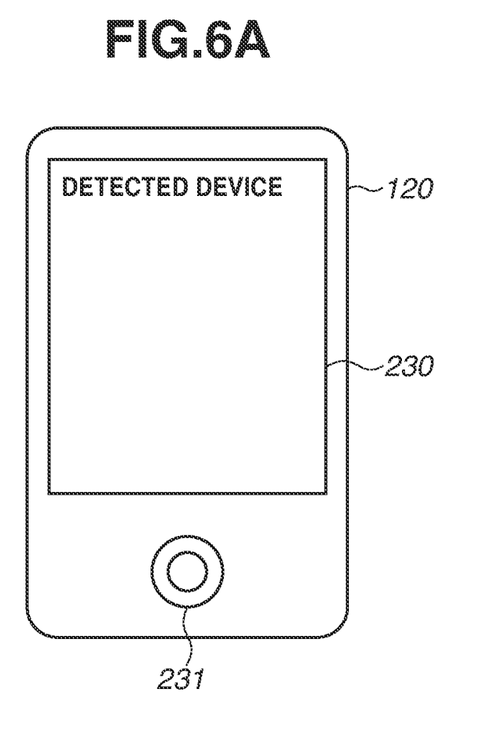
FIGS. 6A and 6B are diagrams each illustrating a display example of the mobile terminal.

FIG. 6A is a diagram illustrating a display example of the display unit 230 when the field intensity is less than the second threshold, i.e., when the mobile terminal 120 belongs in the area outside the second area 132. In this state, the apparatus information is not displayed on the display unit 230. As illustrated in FIG. 6A, the operation unit 231 is shaped like a button. The user can scroll information displayed on the display unit 230 up, down, left, and right by pressing an upper part, a lower part, a left part, and a right part of the button, respectively. In a state where a plurality of items is displayed on the display unit 230, the user can change an item being selected from the displayed items by pressing any of the upper, lower, left, and right parts of the button. The user can determine the selected item or cause operation, such as execution of a selected application, by pressing a central part of the button of the operation unit 231.

Figure 6B:
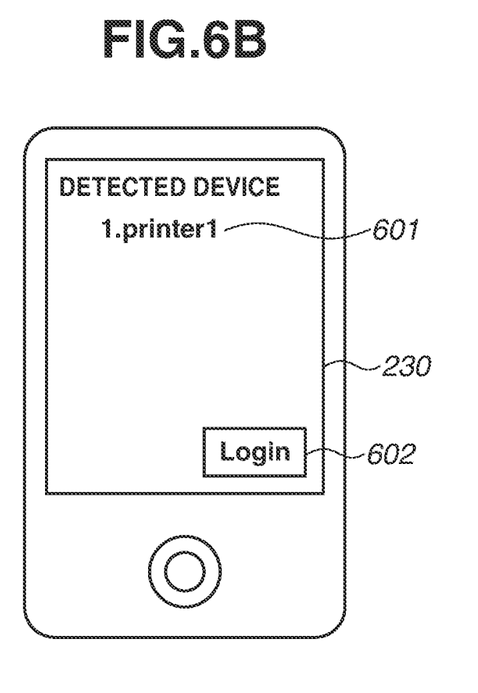

Referring back to FIG. 5, in step S509, the CPU 221 performs control to cause the display unit 230 to display the apparatus information acquired in step S504 and a login button for receiving a login instruction from the user. FIG. 6B is a diagram illustrating a display example of the display unit 230 when the field intensity is less than the first threshold and greater than or equal to the second threshold, i.e., when the mobile terminal 120 belongs to the second area 132. In this state, the apparatus information of the detected external apparatus, i.e., the image forming apparatus 110, is displayed on the display unit 230. In the example illustrated in FIG. 6B, "printer1" is displayed as apparatus information 601. The display unit 230 also displays a login button 602. The login button 602 is used to provide a login request.

When the user presses the login button 602 after selecting an apparatus ID as the apparatus information, the CPU 221 recognizes the press as receipt of a user input for logging into the external apparatus, i.e., the image forming apparatus 110, corresponding to the selected apparatus ID. The display screen illustrated in FIG. 6B is an example of a reception screen for receiving the user input.

Referring back to FIG. 5, in step S510, the CPU 221 confirms whether the user input is received, i.e., reception processing. When the CPU 221 confirms that the user input is received (YES in step S510), the CPU 221 causes the processing to proceed to step S511. When the CPU 221 confirms that the user input is not received (NO in step S510), the CPU 221 causes the processing to proceed to step S502. In other words, the CPU 221 causes the processing to proceed to step S502 when the login button 602 is not pressed, i.e., when the apparatus information is not selected.

In step S511, the CPU 221 establishes Bluetooth® connection with the selected external apparatus, i.e., the mobile terminal 120, and transmits the authentication request to the mobile terminal 120 by using the Bluetooth® connection. The processing then proceeds to step S502. The processing from step S507 to step S511 corresponds to an example of transmission control processing.

The mobile terminal 120 can receive beacon signals from a plurality of external apparatuses. In this case, the mobile terminal 120 acquires the field intensity of each of the beacon signals. The mobile terminal 120 compares the acquired field intensity of each of the beacon signals with the first threshold and the second threshold. The mobile terminal 120 then performs parallel processing for the beacon signals.

Figure 7:
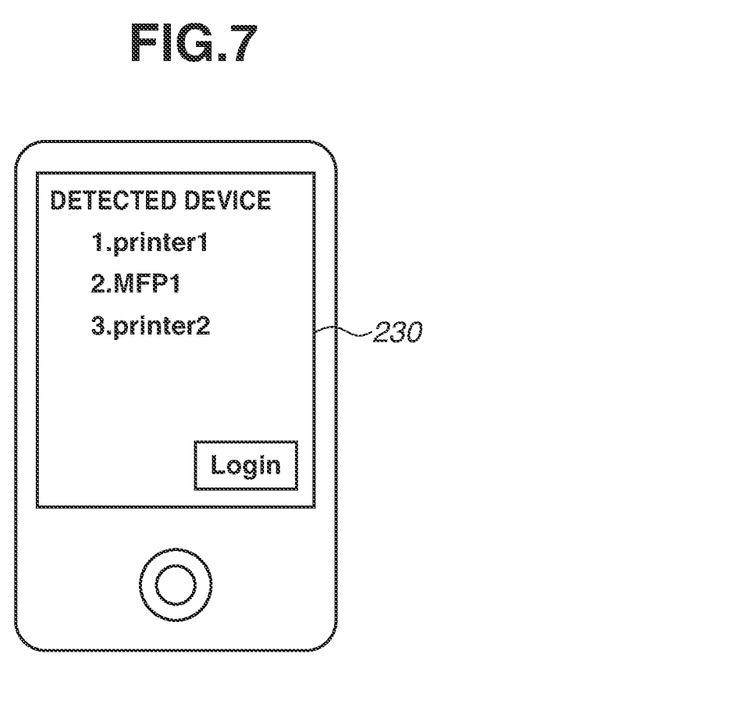
FIG. 7 is a diagram illustrating a display example of the mobile terminal.

FIG. 7 is a diagram illustrating a display example of the display unit 230 when the field intensity of a beacon signal sent from each of three external apparatuses is less than the first threshold and greater than or equal to the second threshold. In this case, apparatus information of each of the three external apparatuses is displayed. In the example illustrated in FIG. 7, "printer1", "MFP1", and "printer2" are each displayed as the apparatus information. When, for example, "MFP1" is selected in this state, "MFP1" can be highlighted.

As described above, when the image forming apparatus 110 is in the second area 132, the image forming apparatus 110 transmits the authentication request on condition of receipt of the user input. When the image forming apparatus 110 is in the first area 131, the image forming apparatus 110 automatically transmits the authentication information without waiting for the user input. In this way, the user operation can be minimized according to the distance from the image forming apparatus 110. Thus, according to the present exemplary embodiment, it is possible to provide a mechanism for appropriately performing the user authentication while simplifying the user operation, even for a wireless communication apparatus not supporting NFC.

In a first modification of the present exemplary embodiment, the apparatus information can include not only an apparatus ID, but also information indicating a state of the image forming apparatus 110, e.g., a state where the user is already logged in or a sleep state. In this case, in step S509, the CPU 221 can display not only the apparatus ID, but also the information indicating the state of the image forming apparatus 110.

In a second modification, the mobile terminal 120 can convert the field intensity determined according to the expression (1) to a distance, and perform threshold processing based on the distance. The two distance thresholds for this comparison are assumed to be stored beforehand in, for example, the HDD 232 of the mobile terminal 120.

In a third modification, the mobile terminal 120 can have, for example, a sensor that detects the inter-apparatus distance between the mobile terminal 120 and the image forming apparatus 110, such as a distance sensor. In this case, the mobile terminal 120 stores beforehand a first area and a second area defined according to the distance from the image forming apparatus 110. Here, the first area is an area in which the distance from the image forming apparatus 110 is less than the first threshold. The second area is an area in which the distance from the image forming apparatus 110 is greater than or equal to the first threshold and less than the second threshold. The second threshold defines the area larger than the area defined by the first threshold. The CPU 221 of the mobile terminal 120 acquires the inter-apparatus distance from the sensor. The CPU 221 can control login processing similar to the login processing described in the first exemplary embodiment. The CPU 221 can determine which one of the first area, the second area, and an area outside the second area, the mobile terminal 120 belongs to, and can control the login processing according to the area to which the mobile terminal 120 belongs.

Next, an image forming system according to a second exemplary embodiment will be described. In the image forming system according to the second exemplary embodiment, a mobile terminal 121 (see FIG. 9) estimates whether a specific user movement (hereinafter, referred to as specific movement) has been performed by a user of the mobile terminal 121. The specific movement is a movement of bringing the mobile terminal 121 close to a communication port of the image forming apparatus 110. When determining whether to transmit the authentication request automatically or on condition of receipt of the user input, the mobile terminal 121 takes into account not only the distance, i.e., field intensity, from the image forming apparatus 110, but also the result of the estimation whether the specific movement has been performed. The image forming system according to the second exemplary embodiment will be described below, focusing on a point different from the image forming system 100 according to the first exemplary embodiment.

Figure 8:
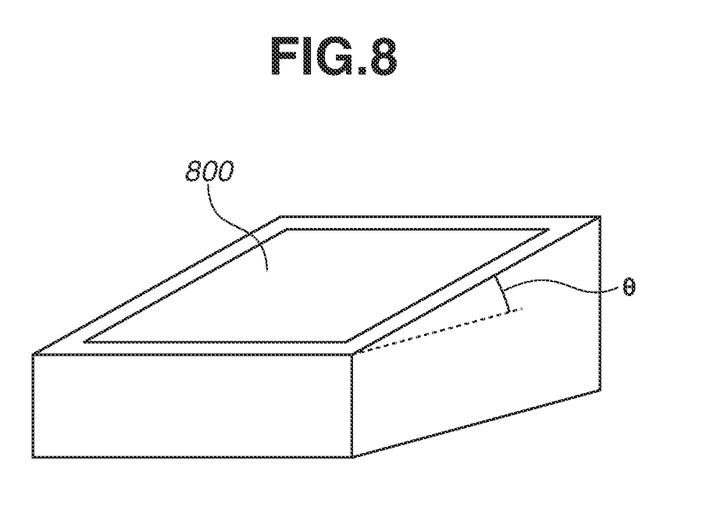
FIG. 8 is a diagram illustrating a device port according to a second exemplary embodiment.

FIG. 8 is a diagram illustrating the device port 111. When the image forming apparatus 110 is installed, a top surface 800 of the device port 111 is inclined at an angle θ relative to a horizontal plane. When logging into the image forming apparatus 110, the user of the mobile terminal 121 places the mobile terminal 121 on the top surface 800. At this moment, the mobile terminal 121 is inclined at the angle θ relative to the horizontal plane, as with the top surface 800. Thus, in the present exemplary embodiment, the mobile terminal 121 estimates whether the user has performed the specific movement of placing (holding) the mobile terminal 121 on (over) the top surface 800, based on the inclination of the mobile terminal 121.

Figure 9:
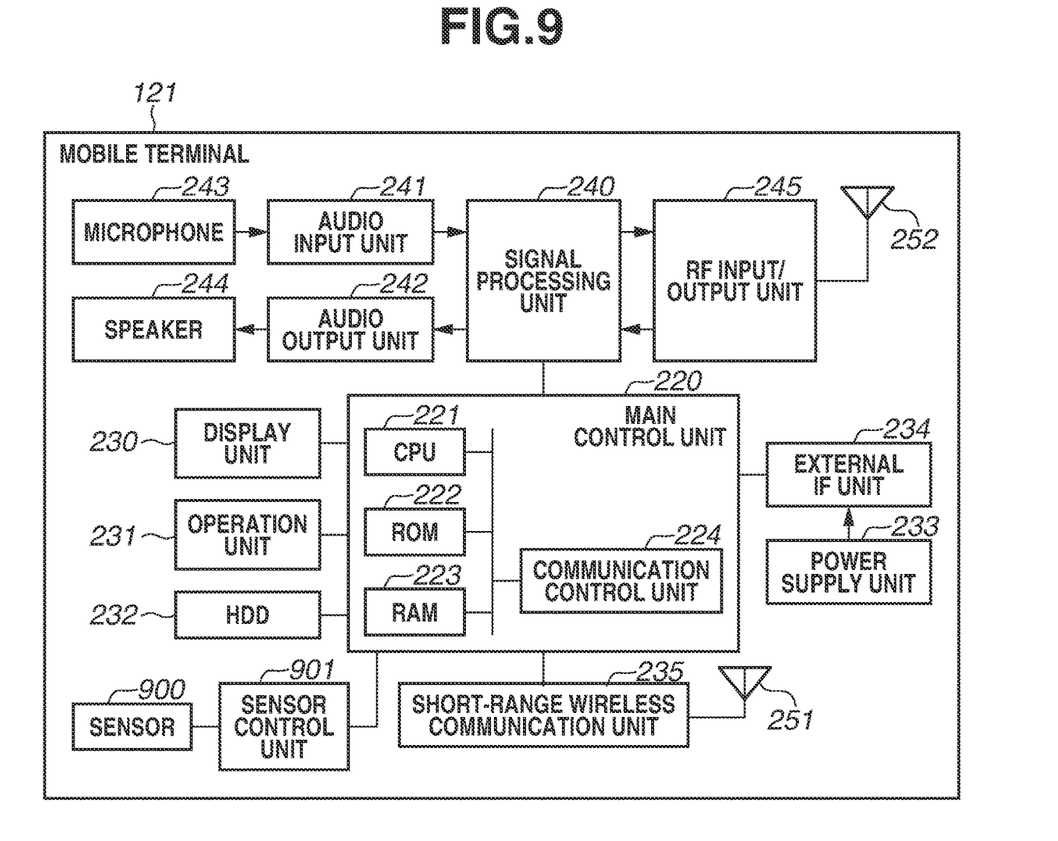
FIG. 9 is a block diagram illustrating a hardware configuration of a mobile terminal according to the second exemplary embodiment.

FIG. 9 is a block diagram illustrating a hardware configuration of the mobile terminal 121 according to the second exemplary embodiment. The mobile terminal 121 of the present exemplary embodiment includes a sensor 900 and a sensor control unit 901 in addition to the configuration of the mobile terminal 120 of the first exemplary embodiment. The sensor 900 is an angle sensor, and detects, i.e., inclination detection processing, an inclination angle of the mobile terminal 121 with reference to a horizontal state where the display unit 230 faces upward. The sensor 900 can detect an inclination angle, relative to each of one direction, e.g., a longer direction of the mobile terminal 121, and another direction, e.g., a shorter direction of the mobile terminal 121, orthogonal to the one direction. The inclination angle is also used for processing, such as changing information displayed on the display unit 230, e.g., displaying the information rotated 90 degrees, and estimating a posture of the user having the mobile terminal 121, e.g., whether the user is standing or lying down. The sensor control unit 901 converts information acquired from the sensor 900 to a predetermined format, and then outputs the information to the main control unit 220.

Figure 10:
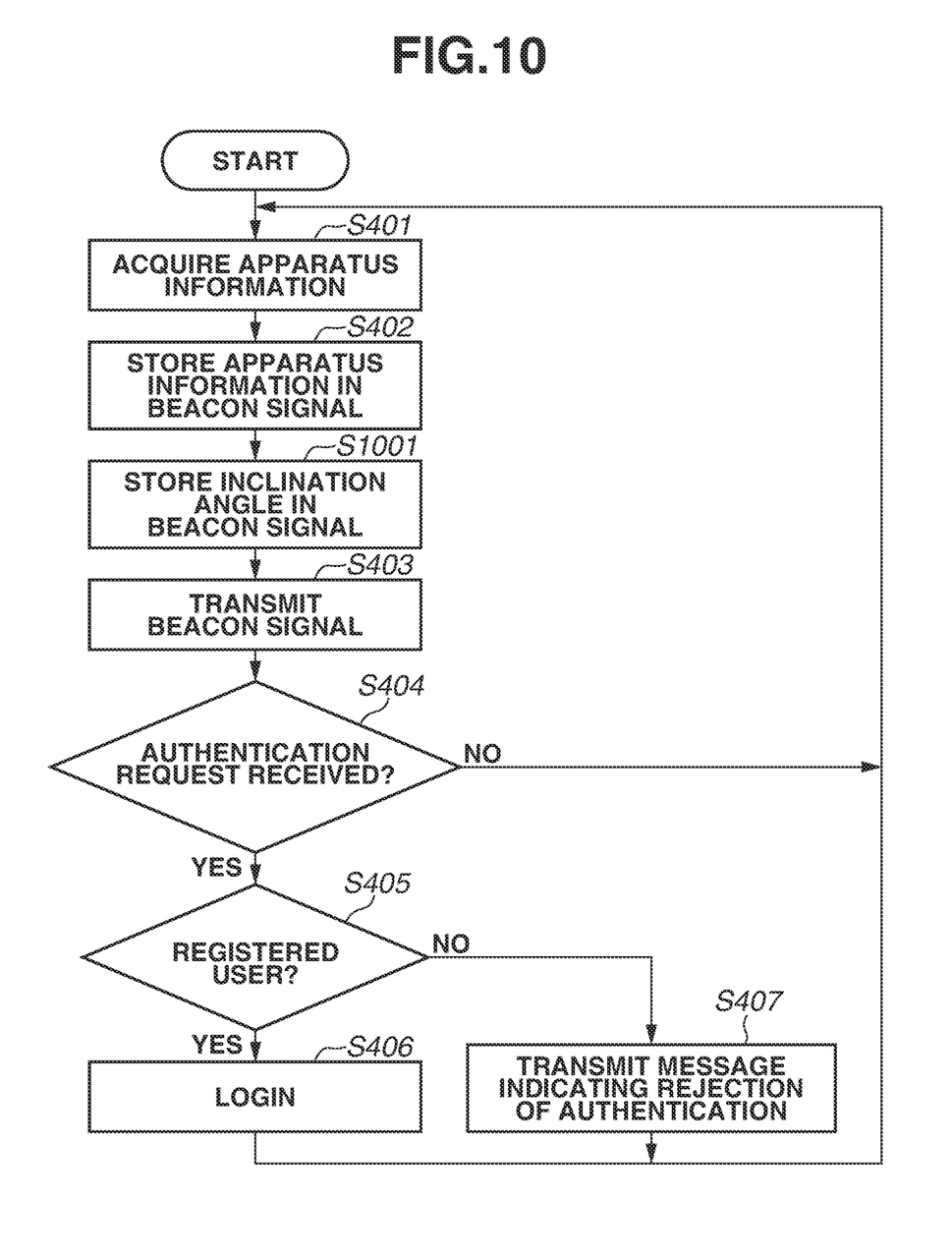
FIG. 10 is a flowchart illustrating login processing according to the second exemplary embodiment.

FIG. 10 is a flowchart illustrating the login processing performed by the image forming apparatus 110 according to the second exemplary embodiment. In FIG. 10, steps identical to those in the login processing performed by the image forming apparatus 110 according to the first exemplary embodiment are provided with reference characters identical to those of the first exemplary embodiment, and will not be described. After step S402, the CPU 201 of the image forming apparatus 110 causes the processing to proceed to step S1001. In step S1001, the CPU 201 stores an inclination angle θ of the top surface 800 of the device port 111 in a beacon signal, and then causes the processing to proceed to step S403. The inclination angle θ is assumed to be set beforehand in, for example, the ROM 202. Next, in step S403, the CPU 201 transmits the beacon signal including the apparatus information and the inclination angle θ. In this way, in the present exemplary embodiment, the image forming apparatus 110 transmits the beacon signal including not only the apparatus information, but also the inclination angle θ.

Figure 11:
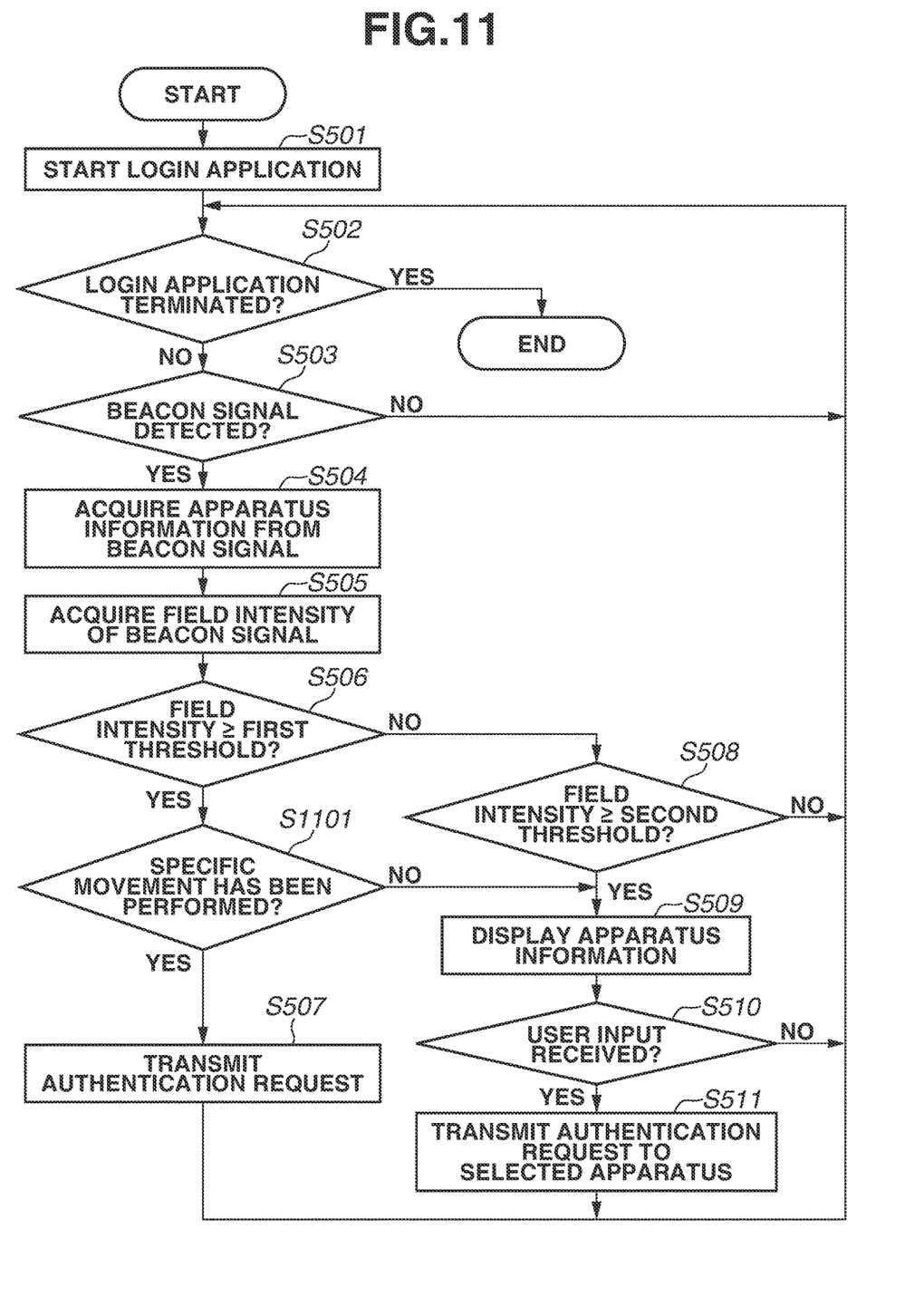
FIG. 11 is a flowchart illustrating login processing according to the second exemplary embodiment.

FIG. 11 is a flowchart illustrating login processing performed by the mobile terminal 121. In FIG. 11, steps identical to those in the login processing performed by the mobile terminal 120 according to the first exemplary embodiment are provided with reference characters identical to those of the first exemplary embodiment, and will not be described. In step S506, when the mobile terminal 121 is in the first area 131 (FIG. 1) (YES in step S506), the CPU 221 causes the processing to proceed to step S1101.

In step S1101, the CPU 221 estimates whether the specific movement has been performed. More specifically, first, the CPU 221 acquires the inclination angle θ of the device port 111 stored in the beacon signal detected in step S503. In addition, the CPU 221 acquires an inclination angle θ from the sensor 900. For convenience of description, the inclination angle θ of the device port 111 acquired in step S101 is referred to as "inclination angle θ1", and the inclination angle θ acquired from the sensor 900 in step S1101 is referred to as "inclination angle θ2". The CPU 221 compares the inclination angle θ2 with the inclination angle θ1. When these angles are the same, the CPU 221 estimates that the specific movement has been performed. The CPU 221 determines that these angles are the same when the inclination angle θ2 is a value in a fixed range determined with reference to the inclination angle θ1.

When the CPU 221 estimates that the specific movement has been performed (YES in step S1101), the CPU 221 causes the processing to proceed to step S507. When the CPU 221 estimates that the specific movement has not been performed (NO in step S1101), the CPU 221 causes the processing to proceed to step S509. Except for this process, the configuration and the processing of the image forming system according to the second exemplary embodiment are similar to the configuration and the processing of the image forming system 100 according to the first exemplary embodiment.

In this way, the mobile terminal 121 according to the present exemplary embodiment automatically transmits the authentication request on condition that not only the distance between the mobile terminal 121 and the image forming apparatus 110 is short, but also the specific movement being estimated to have been performed. For example, the mobile terminal 121 can become close to the device port 111, when the user comes close to the image forming apparatus 110 for a purpose other than login. In this case, in the present exemplary embodiment, the specific movement is not estimated to have been performed, and thus automatic transmission of authentication information can be avoided.

The processing for presuming that the specific movement has been performed is not limited to the processing according to the present exemplary embodiment. In a first modification of the processing for presuming that the specific movement has been performed, the mobile terminal 121 is assumed to have an acceleration sensor as the sensor 900 in place of the angle sensor. The acceleration sensor detects acceleration, i.e., acceleration detection processing. More specifically, the acceleration sensor calculates acceleration for directions orthogonal to each other in a flat plane, e.g., the longer direction and the shorter direction of the mobile terminal 121, and acceleration for a direction orthogonal to the flat plane.

The CPU 221 of the mobile terminal 121 can estimate that the specific movement has been performed, when a state, in which acceleration is a value in an acceleration range including zero, continues for a predetermined time. This corresponds to a case where after the user places the mobile terminal 121 on the device port 111, the mobile terminal 121 makes no further movement and thus, no acceleration is present.

Next, a second modification will be described. In the second modification, the mobile terminal 121 is assumed to have a proximity sensor as the sensor 900 in place of the angle sensor. The proximity sensor detects whether an object is present within a few centimeters of a surface of the mobile terminal 121, for example, a surface where the display unit 230 is disposed, i.e., object detection processing. The CPU 221 can then estimate that the specific movement has been performed when the sensor detects, for example, a hand as the result of the detection. The CPU 221 can perform the determination based on, for example, whether an object at a location within a few centimeters of the display unit 230 is detected by the sensor. This corresponds to a case where the user of the mobile terminal 121 can hold the mobile terminal 121 with a hand when placing the mobile terminal 121 on the device port 111 to login.

In another example, a luminance sensor can be used for detection of a hand. In this example, the mobile terminal 121 includes a luminance sensor as the sensor 900. The luminance sensor detects luminance of a surface, for example, the surface where the display unit 230 is disposed, of the mobile terminal 121, i.e., luminance detection processing. The CPU 221 can then determine that the surface is covered with a hand, i.e., a hand is detected when the luminance is less than or equal to a threshold.

Alternatively, the mobile terminal 121 can have one or more types of sensors as the sensor 900. In this case, the mobile terminal 121 can estimate whether the specific movement has been performed based on a detection result of each of the sensors. With this configuration, whether the specific movement has been performed can be estimated with higher accuracy.

As described above, according to each of the exemplary embodiments, it is possible to provide a mechanism for appropriately performing user authentication while simplifying user operation, even for a wireless communication apparatus not supporting NFC.

While some exemplary embodiments are described above, these specific exemplary embodiments are not limiting.

An exemplary embodiment can also be implemented by such processing that a program that implements one or more functions of the above-described exemplary embodiments is supplied to a system or apparatus via a network or storage medium. One or more processors in a computer of the system or apparatus read the program and then execute the read program. Moreover, an exemplary embodiment can also be implemented by a circuit (e.g., an application-specific integrated circuit (ASIC)) that implements one or more functions.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A mobile communication apparatus comprising:
a wireless communication interface configured to perform wireless communication in accordance with a Bluetooth standard;
a memory device that stores a program; and
one or more processors that execute the program to:
perform a first login request processing for automatically transmitting a login request to an apparatus transmitting beacon signals,
perform a second login request processing for manually transmitting a login request to the apparatus in response to a user instruction, and
detect a field intensity of a beacon signal that is transmitted by the apparatus and that is received by the wireless communication interface,
wherein the first login request processing is performed in a case where the detected field intensity of the beacon signal is equal to or greater than a first predetermined value corresponding to a state in which the mobile communication apparatus is near a proximity target, and is not performed in a case where the detected field intensity of the beacon signal is less than the first predetermined value,
wherein the second login request processing is performed in a case where the user instruction is received while the mobile communication apparatus is in a state where the mobile communication apparatus is within a range in which the detected field intensity of the beacon signal is less than the first predetermined value and is greater than a second predetermined value, wherein the second predetermined value is less than the first predetermined value, and wherein the mobile communication apparatus is able to communicate with the apparatus by the wireless communication interface when the detected field intensity of the beacon signal is greater than the second predetermined value.

2. The mobile communication apparatus according to claim 1, wherein the state in which the mobile communication apparatus is near the proximity target is a state in which a distance between the mobile communication apparatus and the proximity target is within a predetermined distance.

3. The mobile communication apparatus according to claim 2, wherein the predetermined distance is less than 0.1 m.

4. The mobile communication apparatus according to claim 2, wherein the predetermined distance is shorter than a distance between a surface on which the apparatus transmitting the beacon signals is installed and the proximity target.

5. The mobile communication apparatus according to claim 1, wherein the proximity target is a device port of the apparatus transmitting the beacon signals.

6. The mobile communication apparatus according to claim 1, wherein the apparatus transmitting the beacon signals is an image forming apparatus configured to form an image on a sheet.

7. The mobile communication apparatus according to claim 1,
wherein the beacon signal includes identification information of the apparatus transmitting the beacon signals.

8. The mobile communication apparatus according to claim 1, further comprising a display that displays information,
wherein the program causes the one or more processors to:
cause the display to display identification information about the apparatus transmitting the beacon signals in a case where the mobile communication apparatus is within the range in which the detected field intensity of the beacon signal is less than the first predetermined value and is greater than the second predetermined value.

9. A non-transitory storage medium storing a program to cause one or more processors of a mobile communication apparatus including a wireless communication interface configured to perform wireless communication in accordance with a Bluetooth standard to execute a control method, the control method comprising:
performing a first login request processing for automatically transmitting a login request to an apparatus transmitting beacon signals,
performing a second login request processing for manually transmitting a login request to the apparatus, and
detecting a field intensity of a beacon signal that is transmitted by the apparatus and that is received by the wireless communication interface, wherein the first login request processing is performed in a case where the detected field intensity of the beacon signal is equal to or greater than a first predetermined value corresponding to a state in which the mobile communication apparatus is near a proximity target, and is not performed in a case where the detected field intensity of the beacon signal is less than the first predetermined value, wherein the second login request processing performed in a case where the user instruction is received while the mobile communication apparatus is in a state where the mobile communication apparatus is within a range in which the detected field intensity of the beacon signal is less than the first predetermined value and is greater than a second predetermined value, wherein the second predetermined value is less than the first predetermined value, and wherein the mobile communication apparatus is able to communicate with the apparatus by the wireless communication interface when the detected field intensity of the beacon signal is greater than the second predetermined value.

10. A mobile communication apparatus comprising:
a wireless communication interface configured to perform wireless communication in accordance with a Bluetooth standard;
a memory device that stores a program; and
one or more processors that execute the program to:
perform a first login request processing for automatically transmitting a login request to an apparatus transmitting beacon signals,
perform a second login request processing for manually transmitting a login request to the apparatus in response to a user instruction, and
detect a field intensity of a beacon signal that is transmitted by the apparatus and that is received by the wireless communication interface,
wherein the first login request processing is performed in a case where the detected field intensity of the beacon signal is equal to or greater than a first predetermined value corresponding to a state in which the mobile communication apparatus is in contact with a proximity target, and is not performed in a case where the detected field intensity of the beacon signal is less than the first predetermined value, wherein the second login request processing is performed in a case where the user instruction is received while the mobile communication apparatus is in a state where the mobile communication apparatus is within a range in which the detected field intensity of the beacon signal is less than the first predetermined value and is greater than a second predetermined value, wherein the second predetermined value is less than the first predetermined value, and wherein the mobile communication apparatus is able to communicate with the apparatus by the wireless communication interface when the detected field intensity of the beacon signal is greater than the second predetermined value.

11. The mobile communication apparatus according to claim 10, wherein the proximity target is a device port of the apparatus transmitting the beacon signals.

12. The mobile communication apparatus according to claim 10, wherein the apparatus transmitting the beacon signals is an image forming apparatus configured to form an image on a sheet.

13. The mobile communication apparatus according to claim 10, wherein the beacon signal includes identification information about the apparatus transmitting the beacon signals.

14. The mobile communication apparatus according to claim 10, further comprising a display that displays information,
wherein the program causes the one or more processors to:
cause the display to display identification information about the apparatus transmitting the beacon signals in a case where the mobile communication apparatus is within the range in which the detected field intensity of the beacon signal is less than the first predetermined value and is greater than the second predetermined value.

* * * * *